(12) United States Patent
van de Loecht et al.

(10) Patent No.: US 9,079,724 B2
(45) Date of Patent: Jul. 14, 2015

(54) ELECTROMAGNETIC TRANSFER SYSTEM

(75) Inventors: Heinrich van de Loecht, Muggensturm (DE); Martin Reinisch, Esslingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/115,406

(22) PCT Filed: Mar. 19, 2012

(86) PCT No.: PCT/EP2012/054819
§ 371 (c)(1),
(2), (4) Date: Nov. 4, 2013

(87) PCT Pub. No.: WO2012/150087
PCT Pub. Date: Nov. 8, 2012

(65) Prior Publication Data
US 2014/0083817 A1  Mar. 27, 2014

(30) Foreign Application Priority Data
May 3, 2011  (DE) .......................... 10 2011 075 178

(51) Int. Cl.
*B65G 47/28* (2006.01)
*B65G 47/31* (2006.01)
(Continued)

(52) U.S. Cl.
CPC .............. *B65G 47/31* (2013.01); *B65G 47/841* (2013.01); *B65G 54/02* (2013.01); *B65G 19/265* (2013.01)

(58) Field of Classification Search
CPC ...... B65G 47/31; B65G 47/841; B65G 54/02; B65G 19/265
USPC ....................................... 198/459.8, 725, 732
See application file for complete search history.

(56) References Cited

U.S. PATENT DOCUMENTS 1,740,582 A  12/1929 Fred
2,714,441 A * 8/1955 Nolt .............................. 198/719
(Continued)

FOREIGN PATENT DOCUMENTS

DE  102008040204  1/2010
DE  102009029314  8/2010
(Continued)

OTHER PUBLICATIONS

International Search Report for Application No. PCT/EP2012/054819 dated Jun. 13, 2012 (3 pages).

*Primary Examiner* — William R Harp
(74) *Attorney, Agent, or Firm* — Michael Best & Friedrich LLP

(57) ABSTRACT

The invention relates to an electromagnetic transfer system (100) having a preferably closed carrier path (20), along which a multiplicity of individually activatable induction coils (25) are arranged, and having conveying elements (30, 30a to 30e), which are arranged in a movable manner on the carrier path (20) and each have a driver element (38), which serves for conveying in each case at least one article (1) from a first conveying arrangement (11), along a conveying route (18) in the region of the transfer system (100), into a second conveying arrangement (12) arranged downstream, wherein the driver elements (38) are in abutting contact with the at least one article (1) at least along the conveying route (18), and wherein the conveying element (30, 30a to 30e) has, as drive element, at least one permanent-magnet element (31) arranged in operative connection with the induction coils (25). According to the invention, it is provided that the driver element (38) is arranged on the conveying element (30, 30a to 30e) such that it can be moved, in particular pivoted, in order to be brought into abutting contact with, and removed from abutting contact with, the at least one article (1), wherein the driver element (38) is moved by at least one actuating element (43, 44) arranged at a fixed location on the carrier path (20).

9 Claims, 5 Drawing Sheets

(51) Int. Cl.
   *B65G 47/84* (2006.01)
   *B65G 54/02* (2006.01)
   *B65G 19/26* (2006.01)

(56) References Cited

U.S. PATENT DOCUMENTS

| | | | |
|---|---|---|---|
| 3,190,434 A | | 6/1965 | Marcel |
| 3,415,354 A | * | 12/1968 | Benatar et al. ................. 198/732 |
| 3,587,830 A | * | 6/1971 | Calistrat ........................ 198/732 |
| 3,589,497 A | * | 6/1971 | Leach ......................... 198/459.8 |
| 3,845,852 A | * | 11/1974 | Langen et al. ............. 198/419.3 |
| 4,101,020 A | | 7/1978 | Langen |
| 5,501,318 A | * | 3/1996 | Disrud ........................... 198/732 |
| 5,722,532 A | | 3/1998 | Troisi et al. |
| 6,378,693 B1 | * | 4/2002 | Ballestrazzi et al. ......... 198/732 |
| 6,678,107 B1 | | 1/2004 | Krehbiel et al. |
| 6,876,107 B2 | | 4/2005 | Jacobs |
| 2010/0084247 A1 | * | 4/2010 | Wipf et al. .................... 198/617 |

FOREIGN PATENT DOCUMENTS

| | | |
|---|---|---|
| EP | 1123886 | 8/2001 |
| EP | 1300351 | 4/2003 |
| FR | 1547359 | 11/1968 |

\* cited by examiner ical transfer system in such a way that picking up the articles from the feed device and transferring the articles to the downstream conveying device can be carried out along any desired sections of the carrier path. In an electromagnetic transfer system according to the invention, this object is achieved substantially, according to the invention, in that the transport element is arranged on the conveying element such that it can be moved to be brought into operative connection and out of operative connection with the at least one article, wherein the movement of the transport element is carried out by means of at least one actuating element arranged at a fixed location on the carrier path. In other words, this means that, by means of a specific movement of the transport element on the conveying element, the transport element can be brought into operative connection with the respective article at any arbitrary point on the conveying path and, at another, likewise arbitrary point, the article can be transferred to the downstream conveying device.

ELECTROMAGNETIC TRANSFER SYSTEM

BACKGROUND OF THE INVENTION

The invention relates to an electromagnetic transfer system.

A transfer system of this type is known from U.S. Pat. No. 6,876,107 B2. The known transfer system is, in particular, arranged between a first conveying device, for example conveying articles in the form of foodstuffs packages, and a second conveying device following the transfer system. By means of the transfer system, the individual articles can be picked up from the first conveying device and, for example at defined spacings from one another, discharged to the second conveying device. This is important since the second conveying device, for example, feeds the articles to a packaging system arranged downstream, in which it is important that the articles arrive in a specific arrangement or at a specific mutual spacing from one another. In the case of the known transfer system, conveying elements having product pushers are arranged on the closed carrier path, each of which picks up an article from the first conveying device and conveys it along a transport path on the transfer system. To this end, each conveying element can be driven individually, for which purpose permanent magnet elements arranged in the conveying element are used in conjunction with individually activatable induction coils arranged on the carrier path. By means of appropriately driving the induction coils, any desired speed profiles of the conveying elements can be achieved. In the known transfer system, provision is made for the first conveying device, according to FIG. 5 of the text mentioned, to convey the articles in a direction at right angles to the direction of movement of the conveying elements. In order to avoid damage to the articles, it is therefore necessary that the conveying elements stop in the transfer area and, following the transfer of an article from the first conveying device, are moved from the stopped position. A procedure of this type requires a relatively large spacing between the individual articles on the first conveying device, in order that sufficient time remains to transport the respective article away out of the transfer region.

Furthermore, for example from DE 10 2009 029 314 A1, a transfer system is known in which both the feed device to the transfer system and the conveying device arranged downstream are arranged in relation to the direction of movement of the articles parallel to the conveying path of the articles within the transfer system. In this transfer system, which has rotatably arranged conveying elements, in order that the drivers of the respective conveying element are always aligned with the articles, the pick-up region from the feed device and the transfer region to the downstream conveying device are each arranged in a curved region of the carrier path of the transfer system.

SUMMARY OF THE INVENTION

On the basis of the prior art illustrated, the invention is based on the object of developing an electromagnetic transfer system in such a way that picking up the articles from the feed device and transferring the articles to the downstream conveying device can be carried out along any desired sections of the carrier path. In an electromagnetic transfer system according to the invention, this object is achieved substantially, according to the invention, in that the transport element is arranged on the conveying element such that it can be moved to be brought into operative connection and out of operative connection with the at least one article, wherein the movement of the transport element is carried out by means of at least one actuating element arranged at a fixed location on the carrier path. In other words, this means that, by means of a specific movement of the transport element on the conveying element, the transport element can be brought into operative connection with the respective article at any arbitrary point on the conveying path and, at another, likewise arbitrary point, the article can be transferred to the downstream conveying device.

Advantageous developments of the electromagnetic transfer system are specified in the sub-claims. All combinations of at least two features disclosed in the claims, the description and/or the figures fall within the scope of the invention.

In a constructively particularly simple and expedient refinement, provision is made for the actuating element to be formed in the manner of a rail and, in order to control the movement of the driver element, to form a guide which interacts with a guide pin arranged at least indirectly on the driver element. Here, by means of an appropriate shape of the guide, a movement of the guide pin can be achieved which permits a specific movement of the transport element on the conveying element.

In order to permit secure contact and guidance of the articles, even if the driver element is not guided by the actuating element, it is proposed in a further refinement that the driver element be arranged such that it can be pivoted on the conveying element and has a locking element which keeps the driver element in a conveying position.

In a particularly simple constructional design of the locking element, the latter is formed as a spring element arranged on a carrier element. As a result, it is possible, in particular, to dispense with relatively expensive and complicated components which would otherwise permit a locking function, such as pivotable levers, springs or the like, for example.

Particularly preferred is a refinement of the invention in which the conveying element generates a movement component in or counter to the conveying direction of the at least one article. This makes it possible to reduce the product pitch length between two articles in the region of the product exit from the transfer device without it being necessary, for example, to increase the speed of the conveying elements.

In order to be able to adapt the transfer system simply to an extremely wide range of articles or applications, it is moreover advantageous if the carrier element is arranged replaceably as a format part on the conveying element.

As a result of the, in particular, pivotable arrangement of the driver elements on the conveying elements, it is possible for the conveying element to be moved at constant speed during the conveyance of the at least one article without undesired accelerations of the products for this purpose occurring in the transfer region of the articles to the downstream conveying device when the latter is arranged in the region of a curved exit region of the carrier path.

Quite particularly preferred is a refinement of the invention in which a third conveying device, in the region of which the driver elements are arranged in touching contact with the articles only in some regions, is provided between the two conveying devices. As a result, touching contact of the driver elements with the articles and removal from the articles can be carried out at any desired point, in particular outside the entry region and the exit region of the conveying path. In particular, as a result the spacings of the articles before the transfer to the downstream conveying device can also be influenced particularly simply.

BRIEF DESCRIPTION OF THE DRAWINGS

Further advantages, features and details of the invention can be gathered from the following description of preferred exemplary embodiments and by using the drawing, in which.

DETAILED DESCRIPTION

Identical components and components with the same function are provided with the same designations in the figures.

Figure 1:
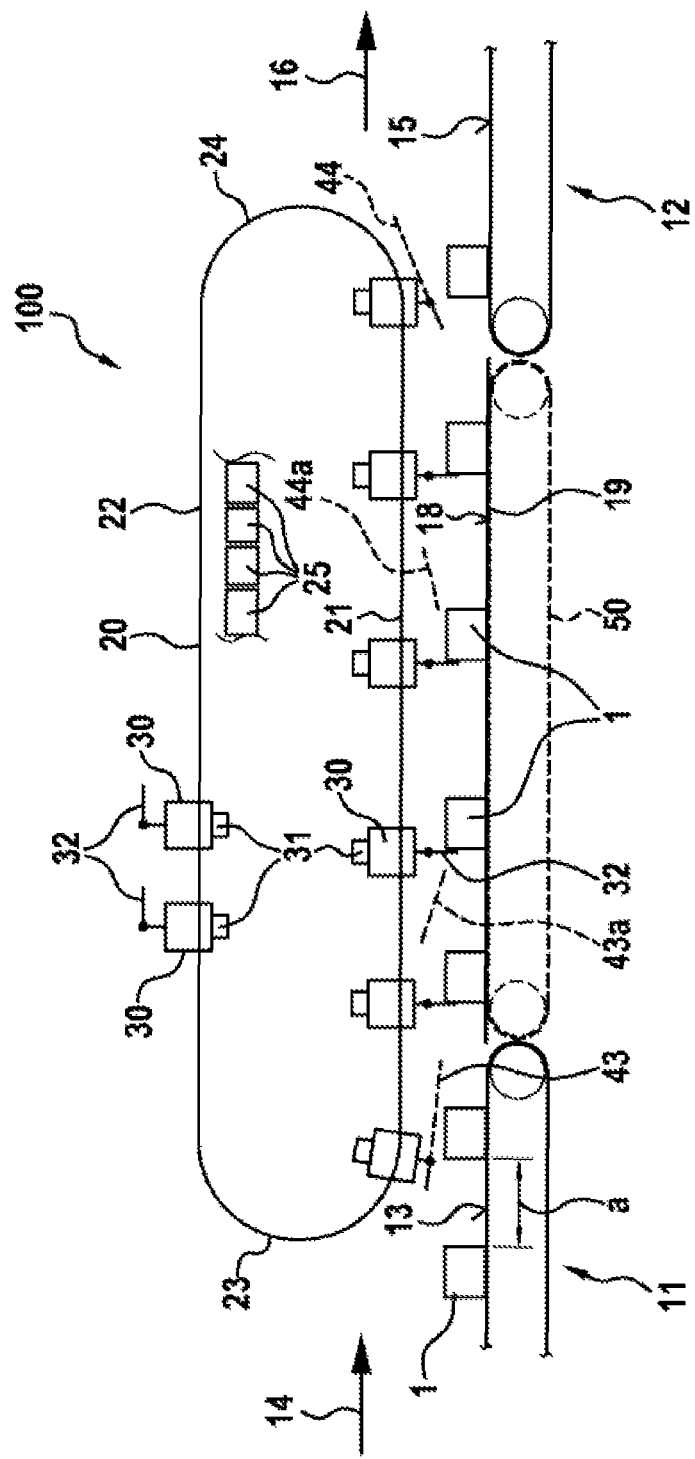
FIG. 1 shows a simplified illustration of an electromagnetic transfer system according to the invention.

In FIG. 1, an electromagnetic transfer system 100 according to the invention is illustrated highly simplified. The transfer system 100 is used to feed articles 1, in particular articles 1 in the foodstuffs industry, such as impact-sensitive chocolate bars, biscuits or the like, which are conveyed on a feed device in the form of a first conveying device 11, to a second conveying device 12 connected downstream of the transfer system 100. Both the first conveying device 11 and the second conveying device 12 in the exemplary embodiment illustrated are respectively constructed as endlessly circulating conveyor belts, wherein the first conveying device 11 is operated either cyclically or continuously, while the second conveying device 12 is preferably driven continuously.

In addition, it is mentioned that both conveying devices 11, 12 can also be constructed differently, since the exact construction is not important to the invention.

The first conveying device 11 forms with its upper side a first conveying plane 13, on which the articles 1 are conveyed in the direction of the arrow 14 with a mutual spacing a from one another. The second conveying device 12 forms with its upper side a second conveying plane 15, on which the articles 1 are conveyed in the direction of the arrow 16. The transfer system 100 has a flat conveying section 18 in the form of a sliding plate 19, the conveying planes 13, 15 and the conveying section 18 forming a common, flat, preferably gap-free, surface and being oriented so as to be aligned with one another.

The transfer system 100 has a closed carrier path 20 which, in the exemplary embodiment illustrated, is formed in the shape of an oval in a vertical plane. In this case, the carrier path 20 comprises two straight carrier path sections 21, 22 which are arranged parallel to each other and which are connected to each other via a semicircular entry region 23 and an exit region 24. In the entry region 23, which reaches as far as the first conveying plane 13 of the first conveying device 11, the articles 1 are picked up by the first conveying device 11 and transferred to the conveying section 18 (sliding plate 19). Likewise, the exit region 24 reaches as far as the region of the second conveying plane 15 of the second conveying device 12, the articles 1 being transferred from the conveying section 18 (sliding plate 19) to the second conveying device 12 in the exit region 24.

Arranged along the whole of the carrier path 20 are individually activatable induction coils 25, the arrangement of the induction coils 25 merely being illustrated as a detail and highly simplified in FIG. 1. The induction coils 25 are used to drive conveying elements 30 arranged so that they can be moved on the carrier path 20. To this end, the conveying elements 30 are arranged such that they can be displaced longitudinally along the carrier path 20 in a manner not illustrated, for example by means of rollers.

Each of the conveying elements 30 has at least one permanent magnet element 31 arranged in operative connection with the induction coils 25. The movement of the conveying elements 30 along the carrier path 20 is achieved in a known way by means of individual activation or energization of the induction coils 25, so that, for example, the induction coil 20 arranged in front of the respective conveying element 30 in the conveying direction exerts an attracting action on the permanent magnet element 31 of the conveying element 30, while, for example, by means of corresponding energization of the induction coil 25 respectively arranged downstream in the conveying direction, a corresponding repelling action on the permanent magnet element 31 is achieved, so that the conveying element 30 can be accelerated, stopped or moved continuously in virtually any desired manner with any desired laws of movement or speed profiles (for example in accordance with a polynomial of fifth or seventh order or in accordance with a $\sin^2$ function). To this end, the transfer system 100 also has, on each of the conveying element 30 and in the region of the carrier path 20, position detection means (for example based on the Hall principle) (not illustrated), so that the position of each conveying element 30 can be determined and is known to the control device of the transfer system 100.

Each of the conveying elements 30 has a pivotably mounted driver 32. To this end, the driver 32 is rotatably mounted on a carrier 33 that can be seen in FIGS. 2 and 3 in an axle 34, the carrier element 33 being replaceably fixed on the conveying element 30 in the manner of a bayonet fixing via, in the exemplary embodiment, two receiving openings 35, 36 for the purpose of format adaptation.

Figure 2:
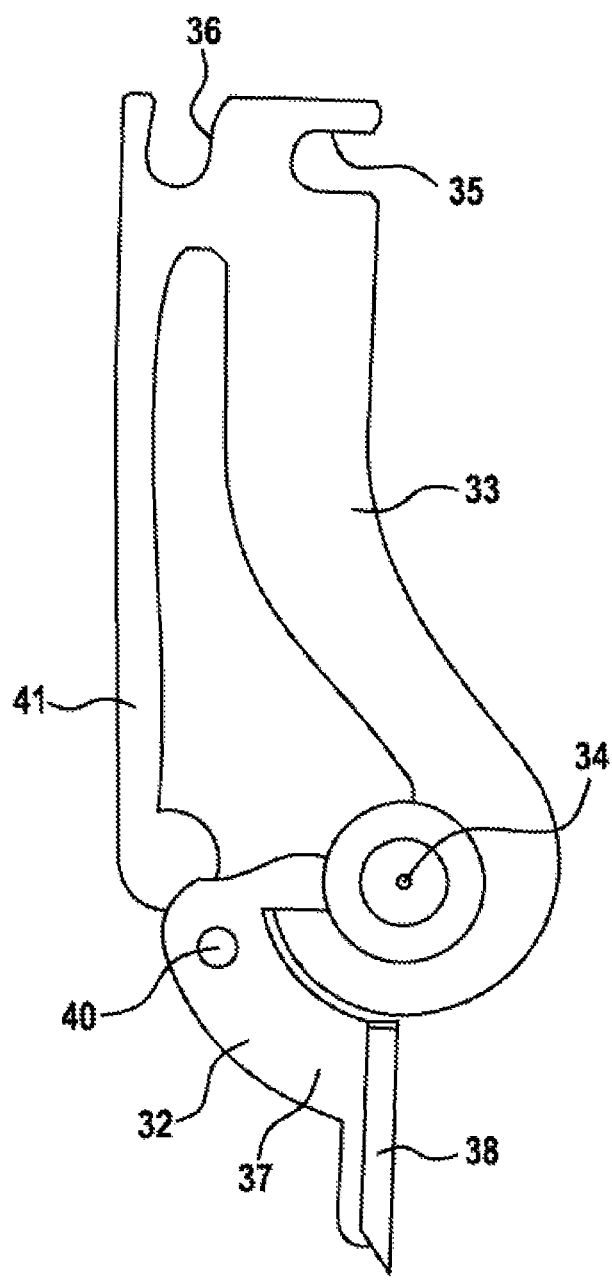
FIGS. 2 and 3 show a conveying element with a pivotable pusher arranged thereon in various positions in side view.
Figure 3:
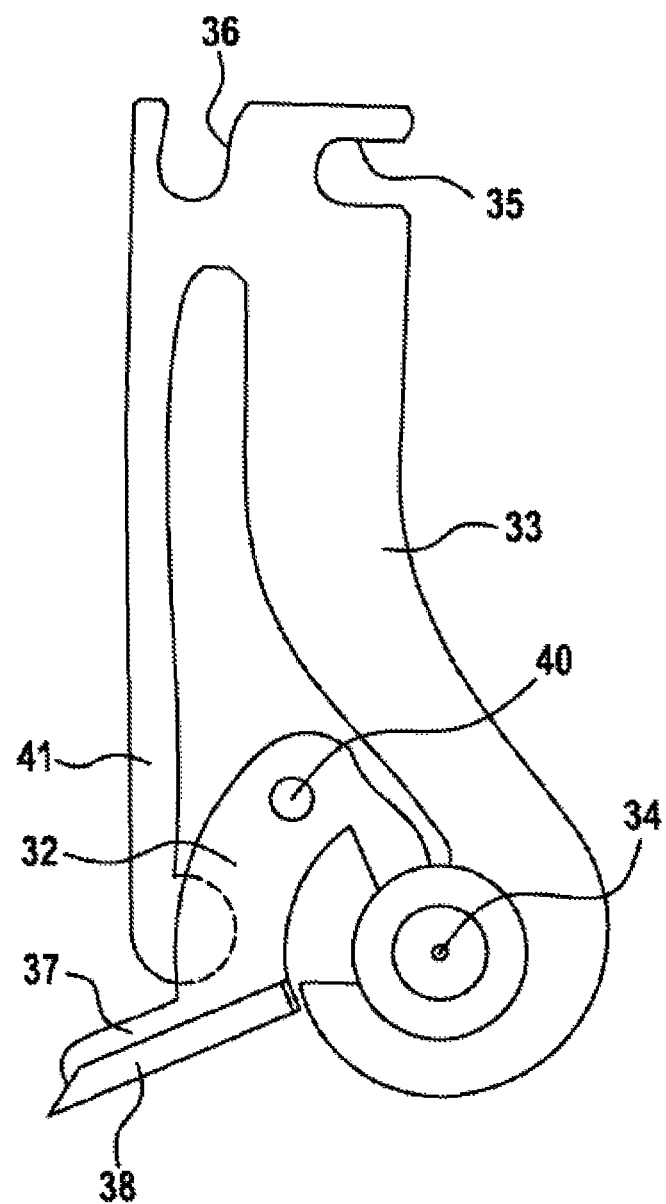

The driver 32 comprises a lever 37, to which there is fixed a driver plate 38, which, in order to transport or to slide an article 1 on the conveying section 18 (sliding plate 19), is arranged in touching contact with the respective article 1. Furthermore, a guide pin 40 is fixed to the lever 37 and, in the exemplary embodiment, has a round cross section and extends at right angles to the plane of the drawing of FIGS. 2 and 3. Also integrally molded on the carrier element 33 is an elastically flexible spring element 41, via which the lever 37 and the driver plate 38 is kept in the conveying position illustrated in FIG. 2, as long as a specific force counter to the conveying direction of the article 1 is not exceeded. In FIG. 3, by contrast, the state is illustrated in which the lever 37 is in a folded-back position. This position is assumed as long as no article 1 is being conveyed by means of the conveying element 30. In FIG. 2, the spring element 41 therefore acts as a locking or stop element for the lever 37.

The movement of the lever 37 and the driver plate 38 is effected by means of rail-like actuating elements 43, 44 arranged in fixed locations along the carrier path 20 in the region of the conveying section 18. Here, one actuating element 43 is located in the entry region 23 in the region of the first conveying direction 11 and reaches virtually as far as the start of the third conveying plane 18, while the other actuating element 44 extends from the transfer region of the sliding plate 19 in the region of the exit region 24 above the second conveying device 12.

Figure 4:
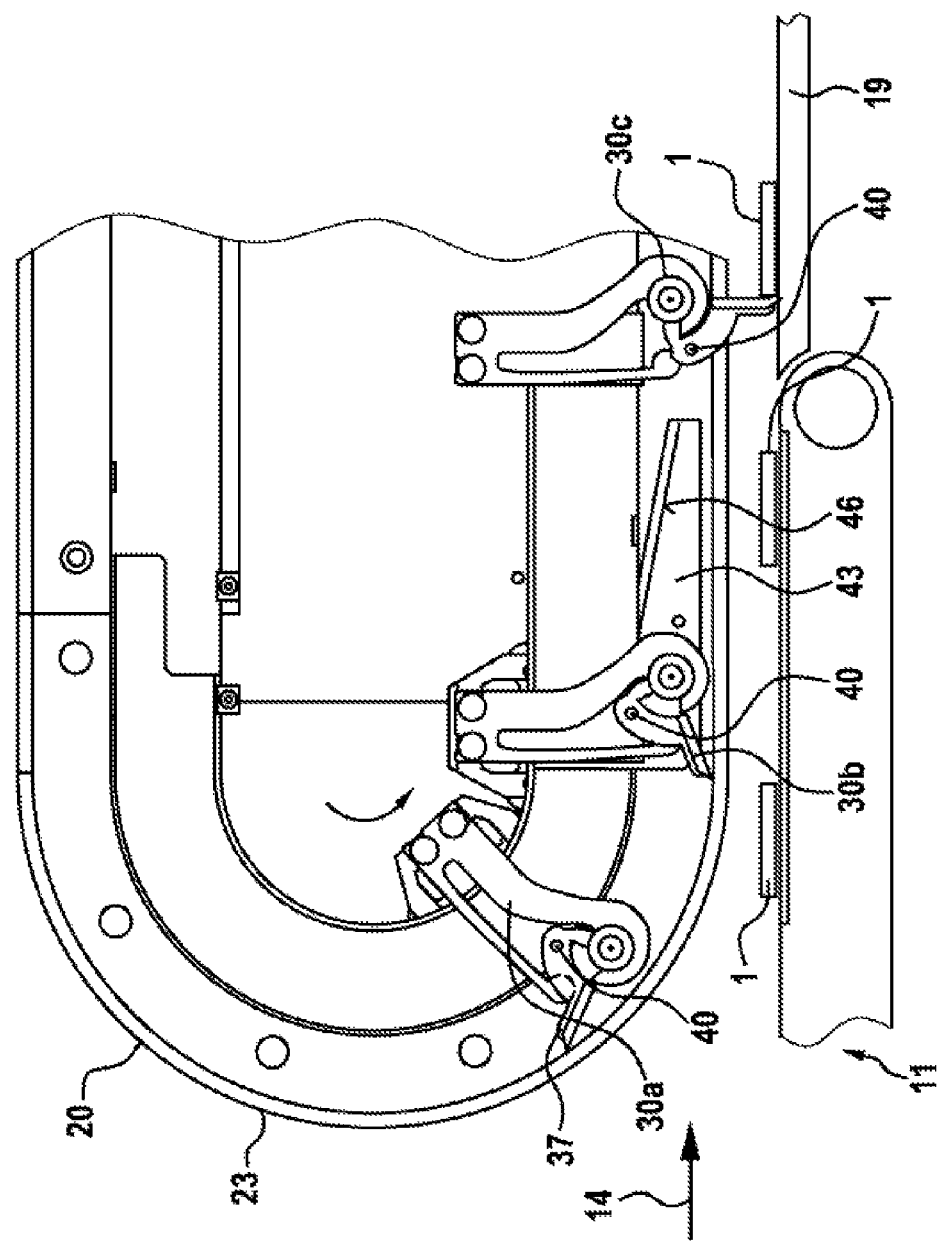
FIG. 4 shows the entry region of the articles into the transfer system in side view.
Figure 5:
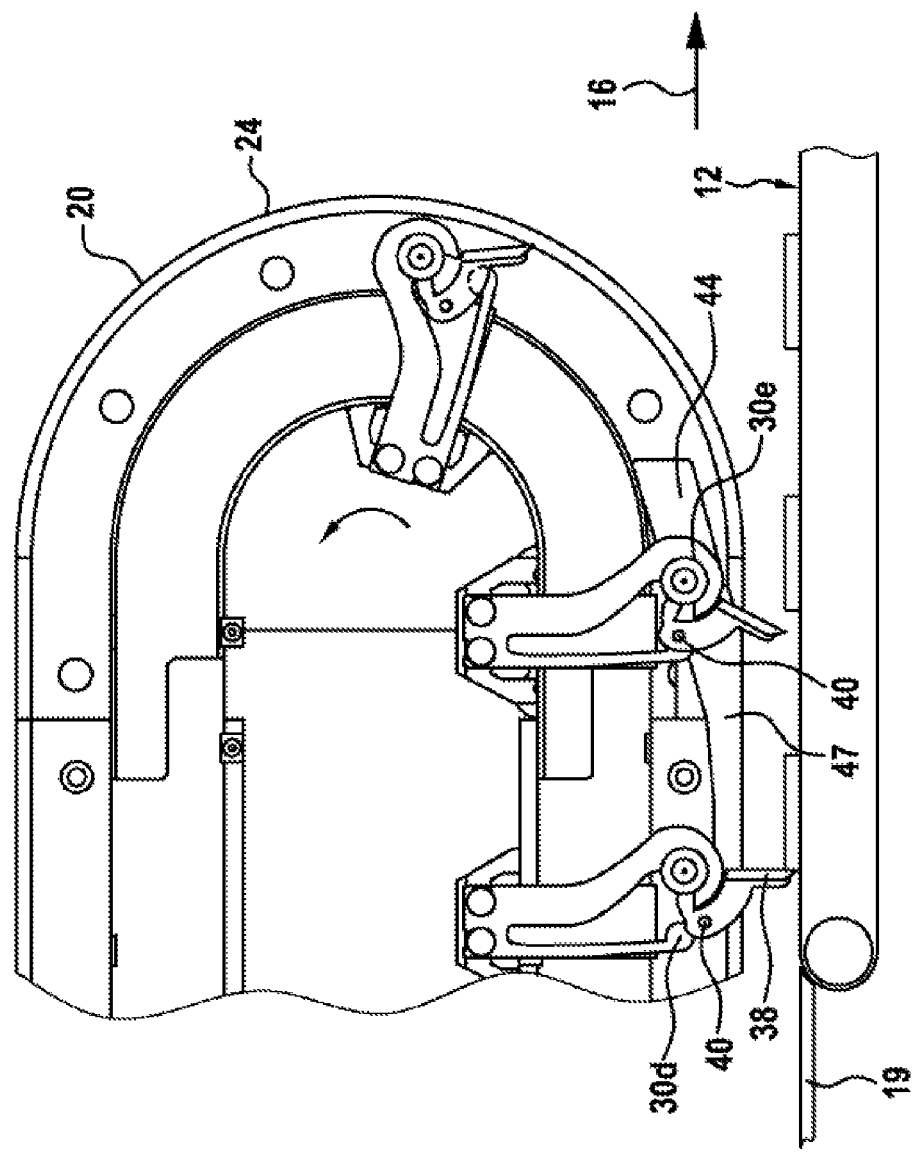
FIG. 5 shows the exit region of the articles out of the transfer system, likewise in side view.

As can be seen from FIGS. 4 and 5 in particular, the two actuating elements 43, 44 are each constructed such that these form a guide 46, 47 for the guide pin 40 of the transport element 30 as soon as the latter comes into the region of the respective actuating element 43, 44. By means of an appropriate shape and arrangement of the actuating elements 43, 44, a specific movement of the lever 37 for picking up an article 1 from the first conveying device 11 into the region of the transfer system 100 and out of the transfer system 100 into the region of the second conveying device 15 is achieved.

As can be seen in particular by using FIG. 4, the lever 37 and its driver plate 38 of a conveying element 30a are initially in their retracted position as they pass through the entry region 23. As can further be seen by using the conveying element 30b, the conveying element 30b in the end region of the first conveying device 11, before the transfer to the sliding plate 19, is moved by the control device of the transfer system 100 in such a way that the conveying element 30b is located between two articles 1. Virtually at the same time, the guide pin 40 of the conveying element 30b also comes into operative connection with the first actuating element 43, so that the lever 37 is pivoted into its driver position between two articles 1. In particular, the conveying element 30b is moved with a speed profile such that (with the lever 37 folded out) the driver plate 38 comes into touching contact with the article 1 assigned to the conveying element 30b while still in the region of the first conveying device 11. This is preferably done without any impact, the conveying element 30b at the transfer time of the article 1 being moved at approximately the same speed as that of the article 1 on the first conveying device 11 or slightly more quickly.

In the case of the conveying element 30c, the article 1 is already located on the sliding plate 19 and is preferably moved continuously by the conveying element 30c, it also being possible for an acceleration or retardation of the article 1 to be carried out along the sliding plate 19. This depends on the conveying speed of the second conveying device 12, or else in order to change the spacings of the articles 1 on the following second conveying device 12 (as compared with the spacings a on the first conveying device 11). It is important that, at the transfer location from the sliding plate 19 to the second conveying device 12, the article 1 has the same speed as the second conveying device 12.

In the exit region 24 of the transfer system 100, illustrated in FIG. 5, the articles 1 are already being conveyed by means of the second conveying device 12, in the case of the conveying element 30d, its driver plate 38 still being in touching contact with the article 1. In the further course, the lever 37 of the conveying element 30e comes into operative connection with the second actuating element 44, so that the lever 37 is pivoted back, by which means the driver plate 38 comes out of contact with the corresponding article 1. Thus, in the transition region between the transfer system 100 and the second conveying device 12, a guided movement of the respective articles 1 is carried out by the conveying elements 30d, 30e, which permits particularly product-friendly transport of the articles 1 in the transfer region.

The transfer system 100 described thus far can be altered or modified in many ways without departing from the idea of the invention. In particular, it is also conceivable that, instead of a pivotable lever 37 with a driver plate 38 fixed thereto, for example the driver plate is also fixed to a piston-shaped or piston-like element, which is activated and deactivated via appropriate actuating elements.

Furthermore, it is conceivable that, instead of a sliding plate 19, a further, third conveying device 50 is provided, for example in the form of an endlessly circulating conveyor belt, on which the articles 1 are conveyed along. This variant is illustrated dashed in FIG. 1. In this variant, the actuating elements 43a, 44a can also be provided (only) in the region of the third conveying device 50, so that the driver plate 38 is moved up to/away from the articles 1 in the region of the third conveying device 50.

The invention claimed is:

1. An electromagnetic transfer system (100) having a carrier path (20), along which a multiplicity of individually activatable induction coils (25) are arranged, and having conveying elements (30, 30a to 30e), which are arranged such that the conveying elements can move on the carrier path (20) and each have a driver element (38), which is used to convey in each case at least one article (1) from a first conveying device (11) along a conveying section (18) in a region of the transfer system (100) into a second conveying device (12) arranged downstream, the driver elements (38) being in touching contact with the at least one article (1), at least along the conveying section (18), and the conveying element (30, 30a to 30e) having, as drive element, at least one permanent magnet element (31) arranged in operative connection with the induction coils (25), wherein the driver element (38) is supported for pivoting movement on a carrier element (33) of the conveying element (30, 30a to 30e) such that the driver element (38) can be moved to be brought into touching contact and out of touching contact with the at least one article (1), wherein the movement of the driver element (38) is carried out by at least one actuating element (43; 43a, 44; 44a) arranged at a fixed location on the carrier path (20), wherein the conveying element (30, 30a to 30e) further has a locking element (41) which keeps the driver element (38) in a conveying position, the locking element (41) formed as a spring element (41) arranged on the carrier element (33), and wherein the at least one actuating element (43; 43a, 44; 44a) is arranged to cause the driver element (38) to pivot into and out of touching contact with the at least one article (1) while the conveying element (30, 30a to 30e) moves along portions of a straight path.

2. The transfer system as claimed in claim 1, wherein the actuating element (43; 43a, 44; 44a) is formed as a rail and, in order to control the movement of the driver element (38), forms a guide (46, 47) which interacts with a guide pin (40) arranged at least indirectly on the driver element (38).

3. The transfer system as claimed in claim 1, wherein the actuating element (43; 43a, 44; 44a) is arranged only in regions of the carrier path (20) in which a movement of the driver element (38) takes place.

4. The transfer system as claimed in claim 1, wherein the articles (1) in the region of the transfer system (100) are conveyed along a rectilinearly formed conveying section (18), in that the carrier path (20) has a curved entry region (23) and a curved exit region (24) and a rectilinearly formed carrier path section (21) arranged parallel to the conveying section (18), and in that the actuating element (43, 44) is arranged at least in the region of the entry region (23) or the exit region (24).

5. The transfer system as claimed in claim 1, wherein spacings between the articles (1) in a region of the conveying section (18) are changed with respect to spacings (a) of the articles (1) in a region of the first conveying device (11) by a retardation or an acceleration of the conveying elements (30, 30a to 30e).

6. The transfer system as claimed in claim 1, wherein the carrier element (33) is formed as a format part and is arranged replaceably on the conveying element (30, 30a to 30e).

7. The transfer system as claimed in claim 1, wherein a third conveying device (50), in a region of which the driver elements (38) are arranged in touching contact with the articles (1) only in some regions, is provided between the two conveying devices (11, 12).

8. The transfer system as claimed in claim 7, wherein the actuating elements (43a, 44a) are arranged in a region of the third conveying device (50).

9. The transfer system as claimed in claim 1, the transfer system (100) having a closed carrier path (20).

\* \* \* \* \*